(12) United States Patent
Ghaboussi et al.

(10) Patent No.: US 7,246,047 B2
(45) Date of Patent: Jul. 17, 2007

(54) METHODS FOR MODELING MATERIAL RESPONSE TO APPLIED FORCE

(75) Inventors: Jamshid Ghaboussi, Urbana, IL (US); Youssef M. A. Hashash, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 656 days.

(21) Appl. No.: 10/409,963

(22) Filed: Apr. 9, 2003

(65) Prior Publication Data

US 2003/0216895 A1 Nov. 20, 2003

Related U.S. Application Data

(60) Provisional application No. 60/371,095, filed on Apr. 9, 2002.

(51) Int. Cl.
 *G06F 17/10* (2006.01)
(52) U.S. Cl. ............................................. 703/2; 702/42
(58) Field of Classification Search ................ 703/2; 702/42
 See application file for complete search history.

(56) References Cited

U.S. PATENT DOCUMENTS 6,397,168 B1 5/2002 Plecnik et al.
2003/0195725 A1 10/2003 Hashash
2003/0216894 A1 11/2003 Ghaboussi et al.

OTHER PUBLICATIONS

Knecht et al., R. Dynamic Load Balancing for the Simulation of Granular Materials, ACM SIGART Bulletin, ACM Press, Apr. 1985, pp. 164-169.*
Dijkstra et al., T.A. Particle Packing in Loess Deposits and the Problem of Structure Collapse and Hydroconsolidation, Engineering Geology, vol. 40, Nos. 1-2, Nov. 1995, pp. 49-64.*
Ghaboussi, J., J.H. Garret, et al. (1991). "Knowledge-based modeling of material behaviour with neural networks." *Journal of Engineering Mechanics Division* 117(1): 132-153.
Ghaboussi, J., D.A. Pecknold, et al. (1998). "Autoprogressive training of neural network constitutive models." *International Journal for Numerical Methods in Engineering* 42(1): 105-126.
Ghaboussi, J & D.E. Sidarat (1997). *New method of material modeling using neural networks*. 6th International Symposium on Numerical Models in Geomechanics.
Hashash, Y.M.A. (1992). "Analysis of deep excavations in clay," Doctoral thesis submitted to Massachusetts Institute of Technology.

(Continued)

*Primary Examiner*—Russell Frejd
(74) *Attorney, Agent, or Firm*—Greer, Burns & Crain, Ltd.

(57) ABSTRACT

A method for modeling the interaction of granular material with equipment includes the steps of numerically representing the material with an array having a plurality of cells, determining which of the cells may be unstable using a self-organizing computational model, and modeling the motion of the unstable cells using the model. Preferably, output is provided in virtual reality format in real time.

32 Claims, 2 Drawing Sheets

OTHER PUBLICATIONS

Hashash, Y.M.A. & A.J. Whittle (1996). "Ground Movement Predicition for Deep Excavations in soft Clay." *Journal of Geotechnical Engineering* 122(6): 474-486.

Prevost, J.H. & R. Popescu (1996). "Constitutive Relations for Soil Materials." *Electronic Journal for Geotechnical Engineering.*

Roscoe, K.H. & J.B. Burland (1968). "On the generalized stress-strain of "wet" clay." *Engineering Plasticity.* J. Heyman: 535-609.

Sidarta, D. & J. Ghaboussi (1998). "Constitutive Modeling of Geomaterials from Non-uniform Material Tests." *International Journal of Computers and Geotechnics* 22(1).

Whittle, A.J., Y.M.A. Hashash, et al. (1993). "Analysis of deep excavation in Boston." *Journal of Geotechnical Engineering* 119(1): 69-90.

Femmam et al., S. "Perception and Characterization of Materials Using Signal Processing Techniques," IEEE Transactions on Instrumentation and Measurement, vol. 50, No. 5, Oct. 2001, pp. 1203-1211.

Singh, S. "Learning to Predict Resistive Forces During Robotic Excavation," IEEE International Conference on Robotics and Automation, vol. 2, May 1995, pp. 2102-2107.

Wu eet al., x. "Representation of Material Behavior: Neural Network-based Models," IJCNN International Joint Conference on Neural Networks, 1990, pp. 229-234.

Carillo et al., A. "Design of a Large Scale Discrete Element Soil Model for High Performance Computing Systems," Proceedings of the 1996 ACM/IEEE Conference on Supercomputing (CDROM), 0-89791-854-1.

American Society for Testing and Materials, "Standard Test Method for Penetration Test and Split-Barrel Sampling of Soils," pp. 1-5. (Mar. 1999).

American Society for Testing and Materials, "Standard Test Method for Mechanical Cone Penetration Tests of Soil," pp. 1-5. (Jan. 1999).

Cundall, P.A. "A Computer model for simulating progressive, large scale movements in blocky rock systems," in International Symposium on Rock Mechanics. (1971) ISRM, Nancy, France.

Lehner, V.D., "Real-time simulation of soil interaction and stability for an earth-moving equipment prototyping system," 1995. v, 56 leaves.

Hashash, Y.M.A., J. Ghaboussi, S. Jung, and C. Marulanda. "Direct field calibration of model simulations of deep excavations." In Plasticity, Damage and Fracture at Macro, Micro and Nano Scales, Plasticity (2002) Aruba: NEAT Press.

\* cited by examiner time T time T +ΔT

METHODS FOR MODELING MATERIAL RESPONSE TO APPLIED FORCE

PRIORITY CLAIM

This application claims priority of U.S. Provisional Application Ser. No. 60/371,095, filed Apr. 9, 2002 under 35 U.S.C. §119.

STATEMENT OF GOVERNMENT INTEREST

This invention was made with Government assistance under National Science Foundation Grant No. CMS01-13745. The government has certain rights in the invention.

FIELD OF THE INVENTION

The present invention is related to methods and program products for modeling material response to an applied force.

BACKGROUND OF THE INVENTION

Material models are useful for a wide variety of applications. As an example, product developers may use material models in their development efforts to fine tune equipment design. By way of particular example, designers of earth moving equipment may use models that simulate movement of the earth moving equipment as it operates on the soil. This particular type of modeling may be useful, for instance, to predict resistive forces experienced by the equipment.

One class of material models are so-called real time models such as virtually reality (VR) based models. These models have important potential applications in engineering. Included among these engineering applications are VR simulators with realistic force feedback for applications such as equipment design, equipment operator training, and the like. Referring again to an exemplary earthmoving equipment application, VR models may be useful for testing crashworthiness, operator training, and crashworthiness.

To date, however, these applications have had difficulties in achieving realistic and real-time modeling of the medium-tool interaction. Existing real-time models of the medium, such as granular soils, focus on creating visually pleasing graphics in virtual environments. In order to achieve real time speed, however, these models have sacrificed a detailed mechanics analysis of the soil. They are also limited in their ability to accurately estimate the force feedback exerted by the soil medium on the equipment and the vehicle engine.

Current real time material models such as soil models have other limitations. A majority of existing soil models are aimed at describing the deformation of the soil masses. The soil masses in these problems are typically modeled as continua. The preferred approach in analyzing these problems is to use quasi-static or dynamic nonlinear finite element analysis. Although they may look visually realistic, current continuum-based approaches to model real-time soil response have fundamental limitations that hamper their practical application.

For example, the change in particle position in a continuum model may be physically unrealistic. During a slope cut, for instance, a continuum model may move a soil particle at the top of the slope to the bottom of the re-equilibrated soil pile. This is not an accurate representation of reality, where a deep-seated slope failure and drastically different soil displacements are expected. If modeling a vehicle interaction with the soil, the force feedback into the vehicle dynamics is not based on realistic forces from the soil pile. Accordingly, continuum models of the soil are not capable of describing the large movement of the soil masses that occur in earthmoving operations.

The movements of masses of particulate material in response to manipulations by earth moving tools, such as loader buckets and bulldozer blades, follow very complex rules. Contrary to many existing real-time soil models, these rules are not local and often have global characteristics. Accurate modeling requires capturing the soil response due to large movement of soil particles caused by the equipment such as loading and dumping, digging and scraping. Soil masses may undergo significant changes in their geometry, including the formation and modification of the soil piles and the instability and failure of the slope in the existing soil pile.

Accurate discrete element models have been developed to describe the large movement of particulate and bulk materials. These models have been used in industrial material handling and mining applications. Discrete element models have also been used in modeling of the large movement of the soil and rock masses. The models simulate the individual particles and the interaction of each particle with particles surrounding and in contact with it. The discrete element method, by way of example, has been successfully used to model the flow of granular materials. Particles of granular material have been represented as simple geometric shapes, such as circular, elliptic or polygonal discs in two-dimensional models and equivalent shapes in three-dimensional models. Because discrete element soil models may accurately simulate the response of the soil mass to earthmoving equipment, they may seem an appropriate choice for VR applications. However, a major drawback of the discrete element models in VR applications is very long computer run times.

Reasonably small discrete element problems with less than 1000 particles may require run times of anywhere from several hours to several days on a typical computer workstation. Realistic models of soil mass on in typical VR applications would require in excess of a hundred thousand three-dimensional particles. Computer simulation of such large systems for several minutes of real time would require several days of CPU time on even the fastest super-computers.

These and other problems remain unresolved in the art.

SUMMARY OF THE INVENTION

The present invention is directed to methods and program products for modeling the response of a material to an applied force, such as forces applied by moving equipment. One embodiment of the present invention includes the steps of numerically representing the material using an array having a plurality of cells, determining which of the cells may be unstable and of modeling motion of the unstable cells using a self-organizing computational model. In preferred embodiments of systems and methods of the invention, modeling is performed in real time. Preferred embodiments of the present invention thereby offer the advantages and benefits of providing an accurate granular material response to interaction with equipment in real time.

DETAILED DESCRIPTION

Figure 1:
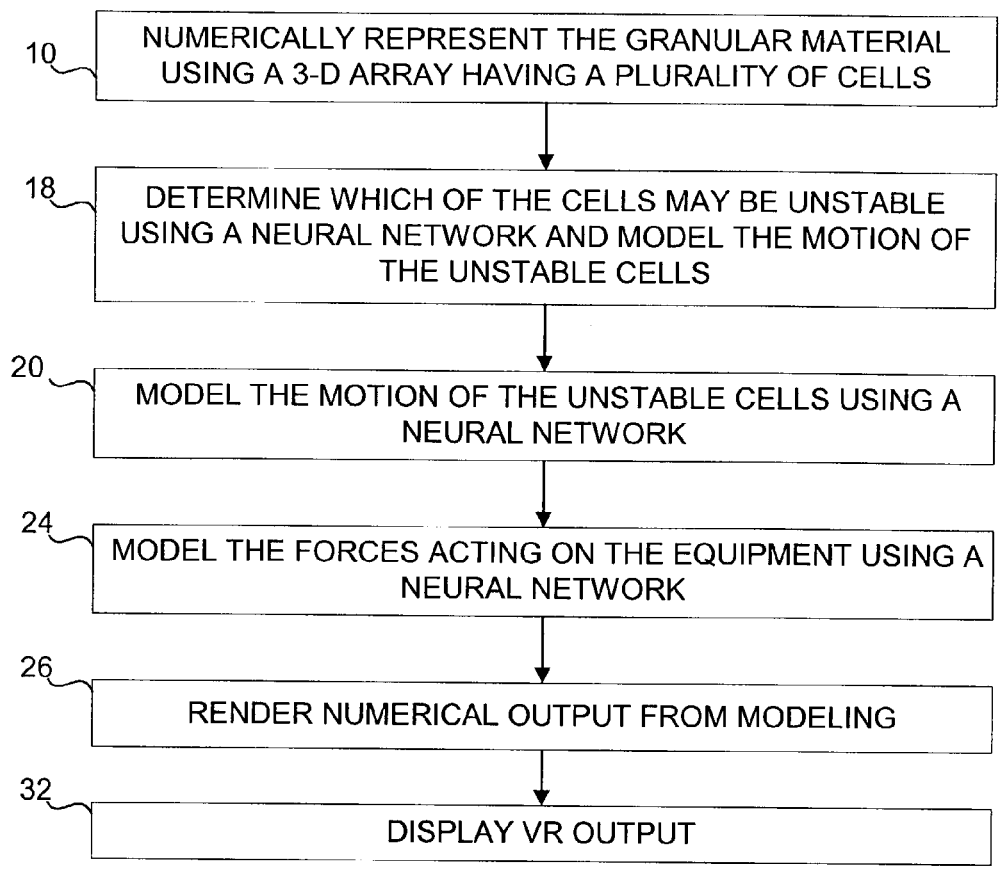
FIG. 1 is a flowchart of a preferred method of the invention.

The present invention is directed to methods for modeling the response of materials, including granular materials such as soils, to an applied force. The applied force may result from other material, from moving or stationary equipment, from flowing gasses or liquids, or the like. An exemplary applied force results from interaction with equipment, such as earth moving equipment. The movements of masses of granular or particulate material in response to manipulations by earth moving tools, such as buckets of the wheel loaders and blades of the bulldozers, follow very complex rules. These rules are not local and often have global characteristics. Taking the action of the bucket of a wheel loader removing soil from an existing pile, by way of example, the movement of the bucket into the soil pile will first cause some particles of the soil to move into the bucket. When the bucket lifts out of the soil mass, it immediately creates a very steep slope, which is inherently unstable. This unstable slope causes a large mass of soil to move down until it assumes a stable position and a stable shape.

Another example of soil and equipment interaction is dumping of soil by a bucket onto an existing soil pile. When the dumped material lands on the pile of soil, the particles of soil flow until they reach stable positions. The path that the particles take and the final stable positions they reach depend on the shape of the pile of soil and the location the particles land on. The flow of the dumped particles will be very different if they are dumped on a flat surface than if they are dumped on a pile with steep sides.

These examples illustrate how the motion of the soil particles is related in a complex way to the location of the soil particle in the mass and the surface configuration of the soil mass. Starting from a stable soil pile, only the changes in the configuration of the soil pile, including changes in the location of the tool, determine the motion of the particles.

It is believed that there are two primary causes for motion of the particles in a mass of particulate material interacting with forces such as those that result from interaction with moving equipment. The first primary cause is direct contact with the equipment. The second primary cause is the creation of a temporary unstable configuration by the equipment. The unstable condition results in the movement of some additional of the particulate material towards a stable configuration. This fundamental assumption may be generally represented by the relationship:

$$\Delta u = f(x, S, R) \qquad \text{Eqtn. 1}$$

where u is the incremental displacement of the soil particle, x is the position of the particle, S is a vector defining the configuration of the surface, and R a set of parameters defining the interaction with the equipment or other force.

It is extremely difficult to directly and accurately describe these complex patterns of movement through mathematical equations. To do so in a real time environment is for all practical purposes impossible using presently known computer-processing resources. Even if the future should make much more powerful processors available, it is believed that solving this relationship would require processors of a cost that would make their use unattainable to all but a very few.

The invention uses self-organizing computational models to learn the pattern of incremental movement of the particles and to thus provide an accurate representation of Eqtn. 1. As used herein, the term "self-organizing computational model" is intended to broadly refer to self-learning algorithms that can iteratively change to "learn" a solution to a problem. Several self-organizing computational models will be suitable for practice of the invention, with examples including evolutionary computational models, genetic algorithms, neural networks, and the like. Preferred embodiments of the present invention include one or more neural network computational models that learn the complex relationship between the incremental movement of the particles of granular or particulate material such as soil, the instantaneous configuration of the particulate mass and the position of the moving tool. Other models are contemplated, with an example being a genetic algorithm. Eqtn. 1 can be re-stated as:

$$\Delta u = NN(x, S, R) \qquad \text{Eqtn. 2}$$

where the symbol NN represents a multi-layer neural network.

Figure 2:
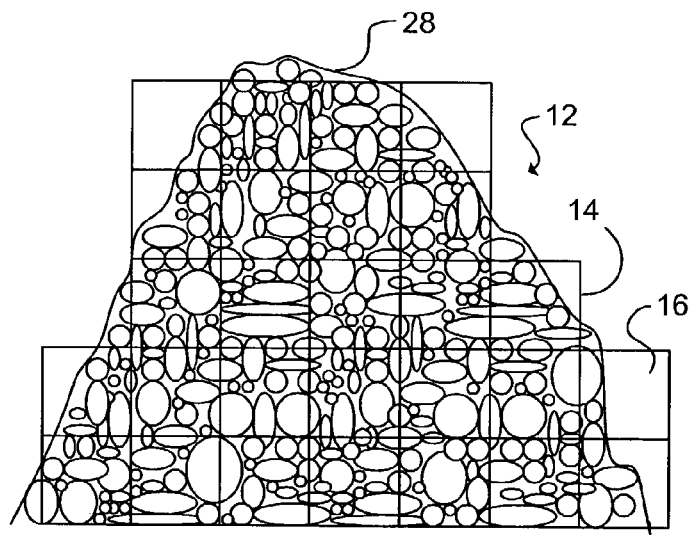
FIG. 2 is a schematic illustration of a two dimensional array applied to a granular material.
Figure 3:
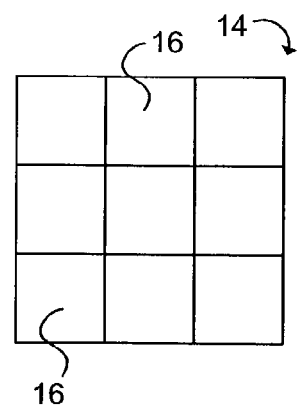
FIG. 3 is a schematic illustration of a portion of the two dimensional array of FIG. 2.

FIG. 1 is a flowchart illustrating in general the steps of a preferred embodiment of the invention. The mass of granular material is first numerically represented by an array having a plurality of cells (block 10). FIGS. 2–3 are useful for illustrating this method step. FIG. 2 shows a two dimensional pile of particles shown generally at 12 to which an array 14 has been applied. The array 14 has a plurality of individual cells 16, with a portion of the array 14 and cells 16 shown in FIG. 3. In addition to 2-dimensional arrays, methods of the invention may also be practiced using 3-dimensional arrays.

The size of the cells may depend on factors such as the speed of computers used to practice the invention method, the size and shape of the individual particles, the size of the moving equipment, and the like. Smaller cells generally require greater processor resources, but offer greater accuracy and a more realistic rendering. Taking a soil application by way of example, each array cell in a 3-dimensional array will preferably be between about 1 cm$^3$ and about 20 cm$^3$. Other applications may have cell sizes that are as small as atomic scale, while still others may be able to use cells as large as m$^3$.

Selection of cell size becomes important when considering speed of execution of the method and program product of the invention. In particular, preferred embodiments of the invention, all of the material and equipment modeling steps of the method are performed in real time. The term "real time" as used herein is intended to broadly refer to a time less than or equal to the time required to perform the operation being modeled. By way of example, if an operation of scooping a portion of a pile of soil were being modeled in real time, the modeling steps would be completed in less than or about the time that it actually took the scoop to operate on the pile of soil.

The preferred method next includes the step of determining which of the cells may be unstable using a neural network (block 18). The neural network is also used to model the motion of the unstable cells over a time step (block 20). The neural network operates treats each of the cells 16 as a network node. In the preferred method and program product of the invention, at least a two-level neural network is used. The first level is used to determine the cells that may be unstable and are likely to undergo large motions. The second level of neural networks is used to determine the direction and the magnitude of the incremental motion for each unstable cell, and to calculate an incremental movement. The neural network is preferably of an adaptive, feed forward architecture.

Generally, the neural network determines cell stability and models motion through operation as summarized by Eqtn. 2. Preferably, the neural network uses as input velocity vectors and stress tensors for all of the cells surrounding one cell of interest as well as that central cell. In a 2-dimensional array as illustrated by FIG. 3, this means that velocity vectors and stress tensors for a block of 9 cells will be input for a time t. For a 3 dimensional array, velocity vectors and stress tensors for each of 27 adjacent cells in a "cube", will be input (e.g., 3 levels of the 9 cell square of FIG. 3) for the time t. The velocity and force vectors may include components in one or more directions. In a two dimensional array x and y direction components will be useful, while an additional z component direction component will be useful in a three dimensional array.

Figure 4A:
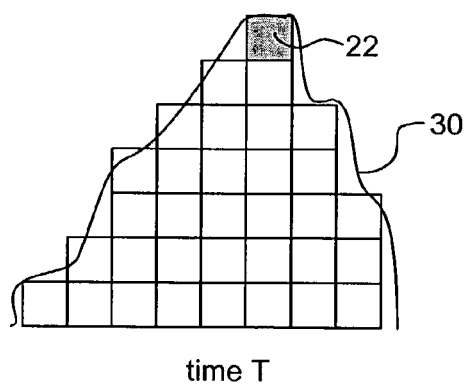
FIGS. 4A and 4B are useful to illustrate modeled motion of a two dimensional array.
Figure 4B:
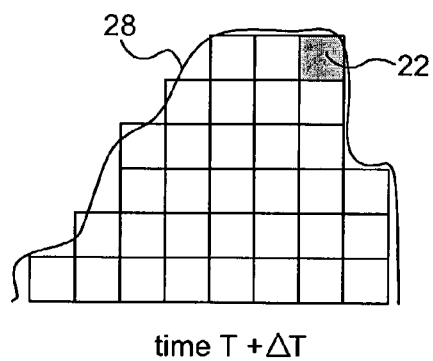

Using these inputs, the neural network will output a velocity vector and a stress tensor for the 1 central cell at a time $t+\Delta t$. This information can be used to determine the direction and amount of movement of the respective cell during the time $\Delta T$, and hence its position at time $T+\Delta T$. By performing this calculation for all of the array cells, movement of all of the unstable portions of the array can be modeled at every time step. A very simple illustration of the result of these steps is illustrated in FIGS. 4A and 4B. These FIGS. schematically illustrate a simple 2-dimensional array at consecutive time steps. The cell 22 (shaded) is in a first position in FIG. 4A representing time T, and has moved to a second position in FIG. 4B at time $T+\Delta T$ as a result of neural network modeling of forces and velocities. The magnitude of the time step $\Delta T$ will vary depending on application, available computer speed, and like factors. By way of example, some applications may require a time step of the order of milli, micro, or nano seconds, while others may only require minutes, hours, days, or even longer periods.

In some applications, it may be desirable to achieve a relatively "rough" granularity on a global scale and a much finer granularity on a local scale. In these applications, the use of sub-cells within cells is contemplated. For example, each array cell may include a three dimensional array of sub-cells. These sub-cells need not be modeled except for the array cells that are determined to be likely to move. For these cells, the movement of individual sub-cells will be determined. This approach offers that advantage of a relatively broad modeling may be performed to determine regions of movement, and then much more focused modeling performed to accurately model the motion in greater detail.

Exemplary methods of the present invention are intended for use in-modeling granular material interaction with stationary equipment and with moving equipment. For example, an embodiment of the present invention will be useful to model the interaction of soil, sand, gravel, or similar bulk and powder materials with a moving equipment such as a digger, a dozer, a scraper, and the like. Another embodiment of the invention may be useful for modeling the interaction of granular grain, pharmaceutical pills, or the like as it is processed by stationary equipment. For example, grain may be poured through a hopper. Other invention embodiments are not limited to granular material, but may include, for instance, continuous solids. Indeed, those skilled in the art will appreciate the utility of the invention for a wide variety of material handling applications that are not limited to bulk and powder.

Also, in addition to modeling material interaction with equipment, the present invention is also applicable for modeling the response of material to an applied force that doesn't result from equipment. Indeed, those skilled in the art will appreciate that modeling methods and program products of the invention will find utility in a wide range of applications. Forces applied from fluid flow, including gasses, liquids, and the like are some examples. Forces applied as a result of flowing water or with wind, for example, are contemplated. Further, forces may be applied at a material boundary, or may be applied internal to the bulk of the material.

A preferred method of the invention, however, is directed to forces resulting from interaction with equipment. Referring once again to FIG. 1, in the preferred method of the invention, an additional method step of modeling the forces acting on the equipment is performed (block 24). This modeling may be performed using the same neural network as is used to model the material, or a separate neural network may be used. If modeling material interaction with moving equipment, the neural network may take into account the geometry, velocity, direction, and force of the moving equipment in the same manner that consideration of the material is made. That is, force and velocity vectors in two or three dimensions will be used to model the equipment. The moving equipment may represent a relatively large continuous piece (e.g., a dozer blade) that interacts with a great plurality of much smaller cells. If the model involves stationary equipment, it may be considered to have zero velocity.

Forces determined may be used for a number of applications including, by way of example, vehicle engine response to the material load on its moving portion, and vehicle wheels-soil interaction. In a general sense, the resistive forces originating from the granular material and acting on the equipment are determined. For a very simple material scooping or dumping application by way of example, the neural network may be used to determine the amount and mass of material gathered in the equipment bucket as it scoops or dumps. For more complex material scraping or dozing applications the determination may require consideration of the changing resistive forces encountered by the equipment as the collective shape and amount of the moved material changes as the equipment moves through it.

A dozer blade will tend to build a pile of material on its face, for example, as it moves through the material. As the pile grows it creates unstable slopes along its sides. Once the pile reaches a certain size, its growth slows as material flows off its unstable slopes and past the sides of the moving dozer blade. The one or more neural networks of preferred embodiments of the invention will model these phenomenon to predict an accurate amount of force experienced by the tool.

Methods of the invention also preferably include steps of rendering the output from the neural network modeling (block 18), and providing output in a VR format (block 26). Rendering processes the numerical output, and may include applying a smooth surface to the array. Rendering can be performed at a desired level of detail. By way of example, an exemplary step of rendering may result in the two dimensional surface outline 28 shown in FIG. 2, or the surface outline 30 shown in FIGS. 4A and 4B. More complex and detailed renderings may include three-dimensional smooth surfaces, as well as images of equipment and the like. In a subsequent step of the preferred method of the invention, the rendered data is output (block 32). Output may include graphical displays, numerical data, sound, a visual rendering of the material and moving equipment, and the like.

Most preferably, output is provided in a virtual reality format. As used herein the term "virtual reality" is intended to broadly refer to a representation intended to closely resemble the modeled event. Using the interaction of a bulldozer and a soil pile as an example, a virtual reality output may include a visual rendering of the bulldozer blade operating on the soil pile. The virtual reality rendering may further include sound, such as a simulated engine sound, blade scraping sounds, and the like. Virtual reality formatted outputs have been found to be valuable for providing a fast and thorough understanding of the modeled event. Virtual reality is also useful for purposes such as operator training, equipment designer development efforts, and the like.

Steps of receiving user input to change the displayed output are also contemplated. For example, through input, a user may be able to change the displayed three-dimensional output to "move around" the rendered image. This will allow for a user to observe it from different perspectives. Methods and program products of the invention may also make use of a virtual reality "helmet" that includes a three dimensional image displayed to a wearer through goggles or the like, and sound output through headphones. The helmet may be wired to respond to head movements, so that as a user rotates his head, for example, the displayed image changes in perspective. User control may also be provided through controls such as a keyboard, mouse, joystick or the like that is used to change the displayed output as desired.

It will be appreciated that methods of the invention will lend themselves to practice in the form of computer program products. For example, a program product may include computer executable instructions stored on a computer readable medium that when executed cause a processor-based device such as a computer to cause steps of the invention to be carried out. Accordingly, it will be appreciated that the present invention includes computer program products, and that description of methods made herein will likewise apply to program products.

In a preferred embodiment of the method and program product of the invention, all of the method and program product steps are performed in real time. It has been discovered that use of neural networks within the methods and program products of the invention allow for accurate modeling to be performed on a real time or faster basis.

Figure 5:
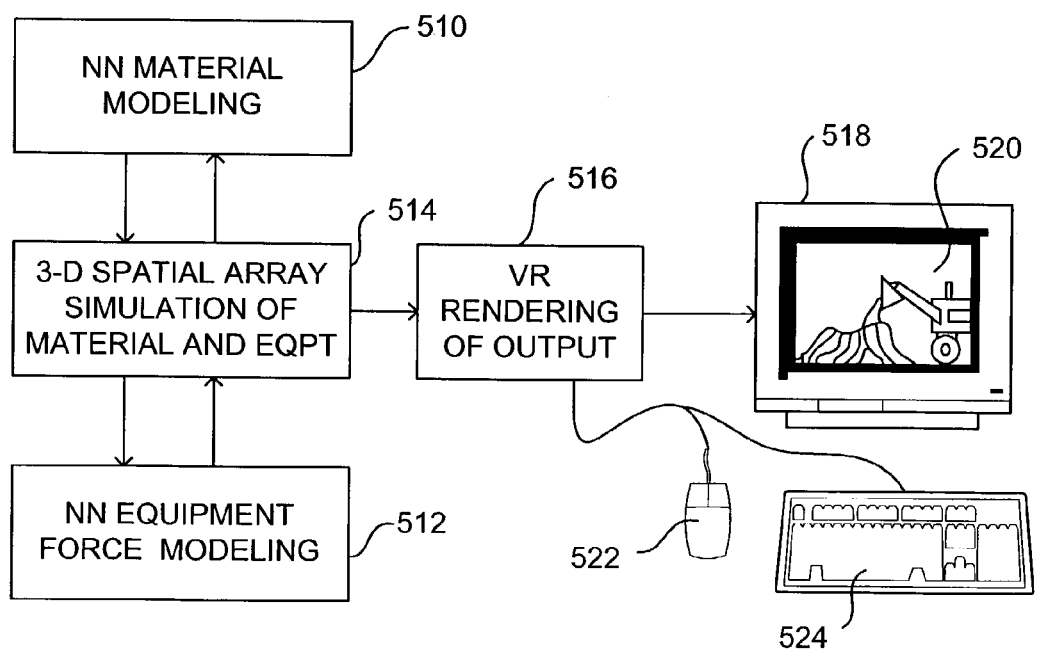
FIG. 5 is a schematic of a preferred embodiment of a program product architecture of the invention.

If practiced as a computer program product, the present invention will preferably be implemented as a set of independent modules—each responsible for a particular task. FIG. 5 schematically illustrates the modules and general architecture of a preferred program product embodiment. These include a neural network material modeling module 510 and a neural network equipment modeling module 512 that perform the basic computational modeling of the material response to equipment actions (material modeling module 510) and the forces experienced by the equipment while interacting with the material (equipment modeling module 512). These two modules 510 and 512 communicate with the module 514 that represents a 3-D array model of the material and equipment.

This 3D array will be updated in real-time by the material model module 510 and the equipment model module 512. At each simulation time step it will represent current spatial soil configuration. The material model module 510 and the equipment module 512 may likewise receive an updated overall state from the 3-D array in real time. The 3-D spatial array module 514 sends data to a rendering module 516 that converts and otherwise prepares numerical output data for visual, audio, and/or other forms of VR representation. Rendering of the numerical data at the module 16 may include applying a smooth texture-based geometry to overlay the 3-D array cells.

Once rendered, the data is communicated to the output module 518 which may show a visual display 520 and provide audio output. The user may provide control or other feedback to the output module 518 through controls such as a mouse 522 and/or a keyboard 524. These controls may be used, for example to change the display 520 perspective, to zoom into a selected portion of the display 520, to show different portions of the display 520, or to effect similar changes to the display 520.

A preferred method of the invention also includes steps of obtaining empirical data characterizing response of the granular material to the moving equipment, and of using the empirical data to train the one or more neural network with the data to capture the complex relationship between the configuration of the material mass, the movement of the material particles, and the forces exerted on the equipment. The most comprehensive data set would be obtained from full-scale field experiments involving interaction of the moving equipment with samples of the material. The trajectory of material particles throughout the material mass would be tracked.

While such experiments are feasible, the cost and effort required to run them may prove to be prohibitively costly and time consuming. An embodiment of the present invention therefore contemplates steps of performing a limited set of field experiments and augmenting the results with a comprehensive simulation method such as the discrete element method.

In the simulations, the movements of delineated zones of the material mass may be tracked as well as the forces exerted on the moving equipment using discrete element or other appropriate based models. Preferably, hundreds of such simulations will be performed using powerful computers for parametric studies of the influence of soil type, and earthmoving equipment configuration. The data sets will then be used to train the neural network soil models. The running of the simulations and the training of the neural network models may be performed on non-real time scale.

The preferred embodiment of the invention also includes steps of running a limited number of full-scale field tests. Taking soil and earthmoving equipment as an example, in full-scale tests the earthmoving equipment are instrumented to measure forces exerted on the hydraulics of the equipment. Optical targets are placed on the surface of the soil pile. The movement of these targets can be tracked in response to earthmoving equipment manipulation by taking a high-speed series of pictures and using them to compute the optical targets' positions as a function of time. Targets may also be placed in the mass of the soil and tracked over time using a three-dimensional tracking system such as a radio wave triangulation method or the like. The data sets produced from this limited number of field experiments is then used to train the neural network model.

Those skilled in the art will appreciate that the preferred embodiment described herein has been discussed for illustration purposes only. Other embodiments are of course possible within the scope of the invention. Indeed, those knowledgeable in the art will recognize equivalents to elements of the described preferred embodiment that are within the scope of the claimed invention. By way of example, although a method and program product has been described with reference to soil, other invention embodiments may include models for use with other granular materials including sand, pills, spheres, grain, and other materials.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for modeling the response of a material to an applied force, the method comprising the steps of:
   numerically representing the material using a 3 dimensional array having a plurality of cells;
   determining which of said plurality of cells will be unstable cells using at least one self-organizing computational model;
   modeling motion of said unstable cells using said at least one self-organizing computational model to generate model output data, and;
   outputting said model output data.

2. A method for modeling as defined by claim 1 wherein each of said plurality of cells comprises a plurality of sub-cells, and wherein the method further comprises the step of using said at least one self-organizing computational model to model motion of each of said sub-cells in each of said unstable array cells.

3. A method for modeling as defined by claim 1 wherein the step of using said at least one self-organizing computational model to model motion of said unstable cells comprises determining a direction and an incremental motion for each of said unstable cells.

4. A method for modeling as defined by claim 1 wherein said array has a surface configuration, and wherein said motion of each of said unstable cells is determined based on the position of each of said unstable cells, at least a portion of said surface configuration, and interaction of each of said unstable cells with the applied force.

5. A method for modeling as defined by claim 4 wherein the applied force results from moving equipment, and wherein the method includes the step of assigning the equipment at least a direction, a velocity, and a force.

6. A method for modeling as defined by claim 1 and further including the step of rendering a visual display of said motion of said unstable cells.

7. A method for modeling as defined by claim 1 wherein the step of modeling motion of said unstable cells using said at least one self-organizing computational model is performed in real time or faster.

8. A method for modeling as defined by claim 1 wherein the applied forces result from equipment, and further including the step of using said at least one self-organizing computational model to model forces acting on the equipment.

9. A method for modeling as defined by claim 8 wherein said forces comprise resistive forces of the material.

10. A method for modeling as defined by claim 8 wherein said at least one self-organizing computational model comprises at least two self-organizing computational models, and wherein the step of modeling movement of said unstable cells comprises using a first of said two self-organizing computational models, and wherein said step of modeling forces acting on the equipment comprises using a second of said two self-organizing computational models to model forces on the equipment.

11. A method for modeling as defined by claim 1 wherein the step of determining which of said plurality of array cells are unstable and the step of modeling motion of said unstable cells includes considering force and velocity vectors for all of the array cells that surround each of said unstable cells.

12. A method for modeling as defined by claim 1 wherein said at least one self-organizing computational model comprises a neural network.

13. A method for modeling as defined by claim 12 wherein said neural network includes a plurality of layers.

14. A method for modeling as defined by claim 1 and further including the step of training said at least one self-organizing computational model with empirical data.

15. A method for modeling as defined by claim 14 wherein the applied forces result from interaction with equipment, and wherein the method further includes the step of obtaining said empirical data by using the equipment to operate on a full-scale sample of the material and recording movement of the material.

16. A method for modeling as defined by claim 15 and further including the step of placing a plurality of sensors on the material sample surface, and of recording movement of said sensors as the equipment operates on the material sample.

17. A method for modeling as defined by claim 15 and further including the step of placing a plurality of sensors in the material sample mass, and of recording movement of said sensors as the equipment operates on the material sample.

18. A method for modeling as defined by claim 1 and further comprising the steps of performing a finite element analysis simulation of equipment interaction with the material to generate simulation data, and of using said simulation data to train said at least one self-organizing computational model.

19. A method for modeling as defined by claim 1 wherein said at least one self-organizing computational model comprises a plurality of self-organizing computational models.

20. A method for modeling as defined by claim 1 wherein said array is three dimensional, and wherein each of said cells in said array represents a portion of the granular material that is between about 1 cm$^3$ and about 20 cm$^3$.

21. A method for modeling as defined by claim 1 and further including the step of providing at least audio and visual output.

22. A method for modeling as defined by claim 1 and further including the step of providing virtual reality output.

23. A method for modeling as defined by claim 1 and further including the steps of displaying said model output data for a user, of receiving at least one user control signal from the user, and of changing said displayed model output data in response to said user control signal.

24. A method for modeling as defined by claim 23 wherein said displayed model output data comprises a visual image, and wherein the step of changing said displayed model output data in response to said user control signal comprises changing the perspective of said visual image.

25. A method for modeling as defined by claim 1 wherein the applied forces result from moving equipment, and wherein the step of modeling motion of said unstable cells comprises modeling motion of said unstable cells due to one or more of scooping, digging, dumping, dozing, or scraping of said material by said moving equipment.

26. A method as defined by claim 1 wherein said model output data comprises numerical data, and further including the step of rendering said model output data to result in a smooth surface.

27. A method for modeling as defined by claim 1, wherein said at least one self-organizing computational model outputs numerical data, and wherein the step of modeling motion of said unstable cells further comprises converting said numerical data into display output comprising a three-dimensional image of the material.

28. A method for modeling as defined by claim 1 wherein the step of outputting said output data comprises outputting said data to a memory.

29. A method for modeling as defined by claim 1 wherein the step of outputting said output data comprises communicating said output data to a user.

30. A method for modeling as defined by claim 1 wherein the step of outputting said output data comprises communicating said output data for additional processing and subsequent display.

31. A method for modeling the response of a granular material to interaction with equipment, the method comprising the steps of:
   numerically representing the granular material using a three dimensional array having a plurality of cells;
   determining which of said plurality of array cells will be unstable cells due to the material's interaction with the equipment using at least one neural network;
   modeling motion of said unstable cells using said at least one neural network to produce output in real time or faster, said modeling including processing of force and velocity vectors;
   rendering said output to apply a smooth surface to said output; and,
   displaying said rendered smooth surface using a virtual reality output.

32. A computer program product for modeling the response of a granular material to applied force, the computer program product including computer executable instructions recorded in a computer readable medium for causing a computer to perform the steps of:
   numerically representing the granular material using an array having a plurality of cells;
   determining which of said plurality of array cells will be unstable cells due to the material's interaction with equipment using at least one self-organizing computational model;
   modeling motion of said unstable cells using said at least one self-organizing computational model to produce output in real time or faster;
   rendering said output; and,
   displaying said rendered output using a virtual reality format.

* * * * *